Aug. 6, 1968  R. BAYLIFF ET AL  3,395,879
AIRCRAFT LANDING GEAR
Filed Sept. 29, 1966  3 Sheets-Sheet 1

INVENTORS
ROBERT BAYLIFF
WALTER J. LeBLANC
JAMES SIDLES
BY John D. Haney
ATTY.

3,395,879
AIRCRAFT LANDING GEAR
Robert Bayliff, Wassenaar, Netherlands, and Walter J. Le Blanc, Troy, and James Sidles, West Richfield, Ohio, assignors to The B. F. Goodrich Company, New York, N.Y., a corporation of New York
Filed Sept. 29, 1966, Ser. No. 583,027
19 Claims. (Cl. 244—108)

ABSTRACT OF THE DISCLOSURE

A landing gear for aircraft, particularly helicopters, has ground support wheels in the form of rotary wire brushes of the type in which the brush spindle is parallel with the brush bristles. These brush-type wheels are mounted for free rotation at the lower end of the landing gear strut on a linkage which permits the rotational axis of each brush type wheel to be tilted laterally of the aircraft to thereby change the number of bristle tips available for ground contact. By so altering the position of these brush-wheels, their rolling resistance may be appreciably varied, and braking effects may be achieved by tilting the brushes to a position in which practically all of their bristles are engaged with the ground. These brush-wheels are arranged in groups at the bottom of each strut and each group is supported for pivotal movement in a direction fore and aft of the aircraft. This gear is quite insensitive to temperature changes and is useful for very cold weather operations or on vehicles having very high landing speeds. Moreover, the frictional engagement of this form of wheel with the ground makes the gear particularly stable and skid-resistant when an aircraft is operated on ice or wet slippery surfaces.

---

This invention relates to aircraft landing gear embodying rotary wire brushes as main ground-support wheels. This improved gear provides excellent skid resistance for light aircraft and helicopters operating on slippery surfaces such as wet smooth ship decks or icy windswept runways. Additionally this gear is quite insensitive to heat and radical temperature changes and is therefore useful for very cold weather operation and for aircraft or airborne vehicles having a very high landing approach speeds (e.g. more than about 250 miles per hour).

Each brush wheel of this gear has a flat bristle base with a central spindle projecting from one side, and with a multitude of slender stiff wire bristles attached to the other side. The bristles may be arranged in bundles twisted together and are generally parallel each other and parallel to the spindle axis. They are attached to the base in a circular array concentric with the spindle and are of substantially equal length so that their free tips collectively define a ground-engaging surface.

These brush wheels are mounted in the gear so that the spindle of each brush is adapted for free rotation, and so that the spindle may be tilted laterally of the direction of its normal forward motion with the vehicle to change the number of bristle tips available for ground contact. By such tilting the rolling resistance of the brush wheel on a ground surface may be varied and easily controlled. Hydraulic pressure cylinders may be conveniently used to control the tilted position of the brushes.

When the spindle of each brush is canted or tilted laterally to present only a limited number of bristle tips to the ground (i.e. to provide a small "footprint") the brush wheel tends to roll more freely than in any other position. Such canted position is the preferred position of the wheel for taxiing, during takeoff runs, or in the initial stages of landing.

Braking with this gear is achieved simply by progressively tilting each brush away from its canted aspect to increase the number of bristle tips in engagement with the ground. Maximum rolling resistance is provided when each brush is shifted to a position in which the spindle and bristles are almost normal to the ground.

When the vehicle is stopped, the brush wheels are ordinarily positioned with their axis normal and all the bristle tips in ground engagement. This position of the brush wheels may be used also for a high speed landing, the brushes rotating very little, if any, under these conditions, and acting essentially like a brush skid.

The rolling resistance of the brush wheels varies with the outside diameter of the bristle array, the number of bristles, and the stiffness of them, as well as the angle to which the brush wheel axis is canted. The rolling performance of a given wheel is easily determined in each installation.

In a particular vehicle, the landing gear units are located symmetrically on opposite sides of the vehicle. Each gear unit preferably includes at least two brush wheels, the axes of which may be canted away from each other (laterally of the movement direction) so that the two wheels rotate in opposite directions to provide rolling stability. A gear unit may include any number of additional brush wheels in multiples of two. In a gear unit having multiple brush wheels, the several wheels are tilted in unison.

The invention will be further described with reference to the accompanying drawings which show by way of example, a landing gear made according to and embodying this invention. The landing gear is described with particular reference to its use on helicopters.

Figure 1:
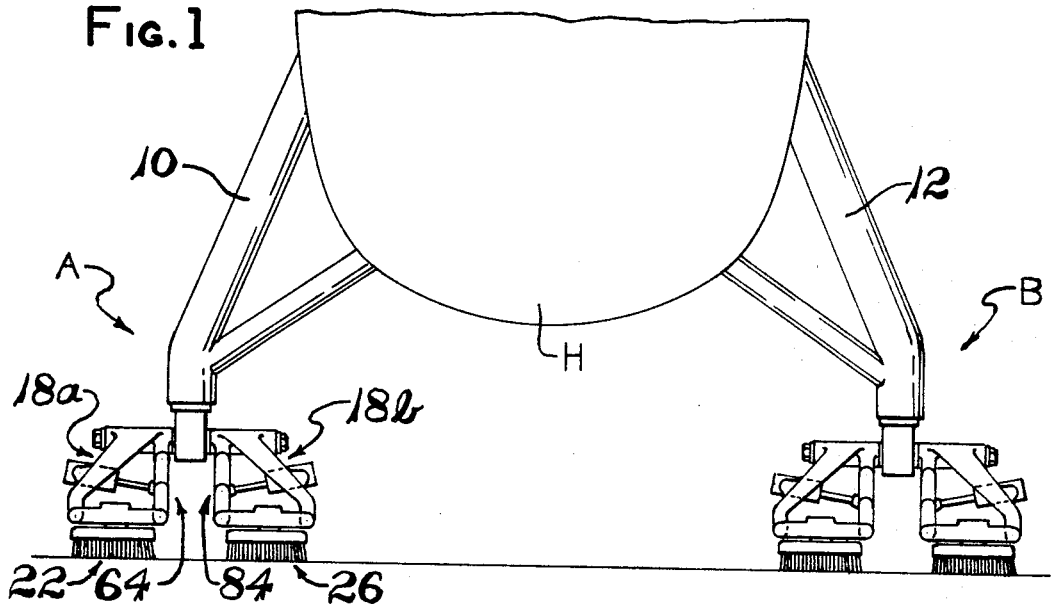
FIG. 1 is a frontal view of a helicopter equipped with a brush wheel landing gear of preferred design.

Referring to FIG. 1, a vehicle such as a helicopter H has two identical brush wheel gear units A and B symmetrically supported on struts 10, 12 on opposite sides of the helicopter. The following explanation of the detailed structure of gear unit A will apply equally to gear unit B.

Gear unit A is connected rigidly to the lower end of strut 10 by a fitting 15 (FIG. 2) having two integral coaxial horizontal spindles—spindle 16a projecting laterally outboard from the strut, and spindle 16b projecting inboard from it.

Pivotally mounted on the spindles are rigid triangular frames 18a and 18b having collars 19a and 19b which fit around the spindles 16a and 16b and are retained thereon by nuts 20a and 20b, respectively. The frames 18a and 18b are accordingly free to swing lengthwise of the vehicle about their spindles.

Figure 5:
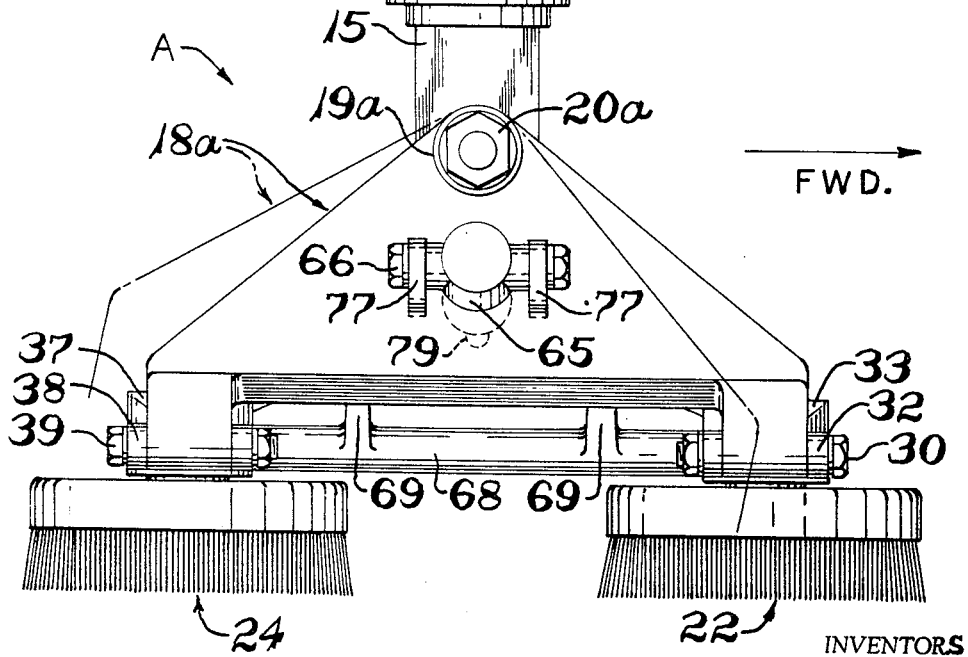
FIG. 5 is a side view of the landing gear along the line 5—5 of FIG. 2 and showing the side of the brush wheels opposite the strut.

Frame 18a supports two outboard brush wheels 22 and 24 (see FIGS. 3 and 5) one behind the other on the outboard side of the strut. Similarly, two inboard brush wheels 26 and 28 are supported in frame 18b inboard of the strut. As will be more fully explained in the following discussion, the two front wheels 22 and 26 tilt and rotate in opposite directions; similarly the two rear wheels 24 and 28 tilt and rotate in opposite directions. The opposite tilting and rotation of these opposing brush wheels tend to stabilize the gear so that it will roll forwardly in a straight path.

Frame 18a is a generally triangular flat rigid plate which slopes downwardly and flares outwardly from its apex (see FIG. 5) where the frame is integrally fastened to the pivot collar 19a. Frame 18b is identical except that it slopes downwardly on the inboard side of the strut from the integral pivot collar 19b at its apex.

At its forward lower corner, frame 18a has a horizontal pivot connection 30 with a yoke 32 (see FIGS. 2 and 3) directed inwardly toward the strut. At about the middle of the yoke 32 there is a round housing 33 receiving and supporting spindle 34 of the outboard front brush wheel 22 for rotation.

Figure 3:
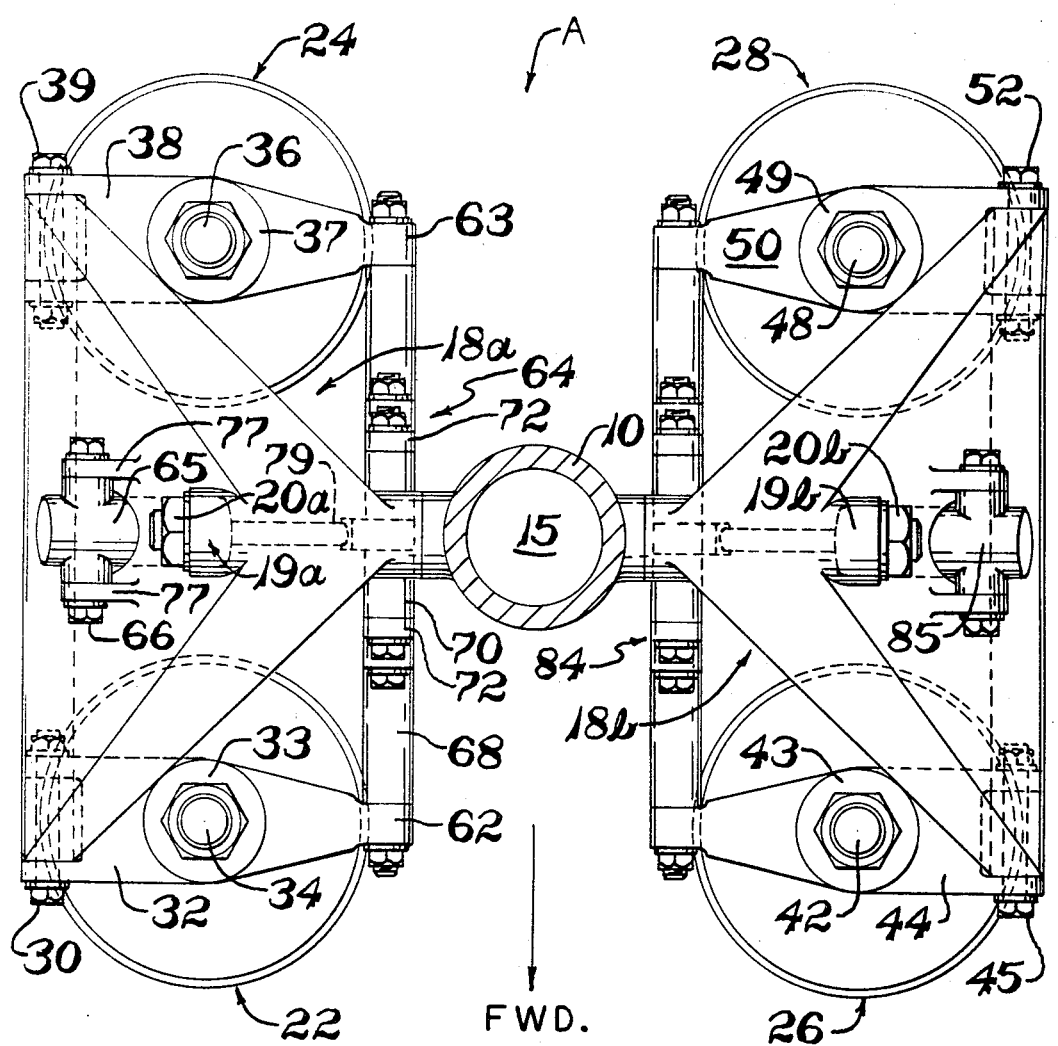
FIG. 3 is a top view of the landing gear along the line 3—3 of FIG. 2 and showing the relationship and connection of the four brush wheels to the landing strut.

The outboard rear brush wheel 24 on frame 18a is similarly rotatably mounted by its spindle 36 in a housing 37 of yoke 38 pivoted at 39 to the lower rearward corner of plate 18a (see FIG. 3).

The inboard brush wheels 26 and 28 are supported in a corresponding way at the lower front and rear corners of frame 18b on the inboard side of the strut, except that the arrangement of the supporting parts is a mirror-like reverse of those on frame 18a.

Thus the inboard forward brush wheel 26 has its spindle 42 mounted in housing 43 on horizontal yoke 44 pivoted to swing vertically on pivot 45 at the lower front corner of frame 18b.

The inboard rear brush wheel 28 has a supporting spindle 48 rotatable in housing 49 on a horizontal yoke 50 pivoted to swing vertically on pivot 52 at the lower rear corner of frame 18b.

Figure 2:
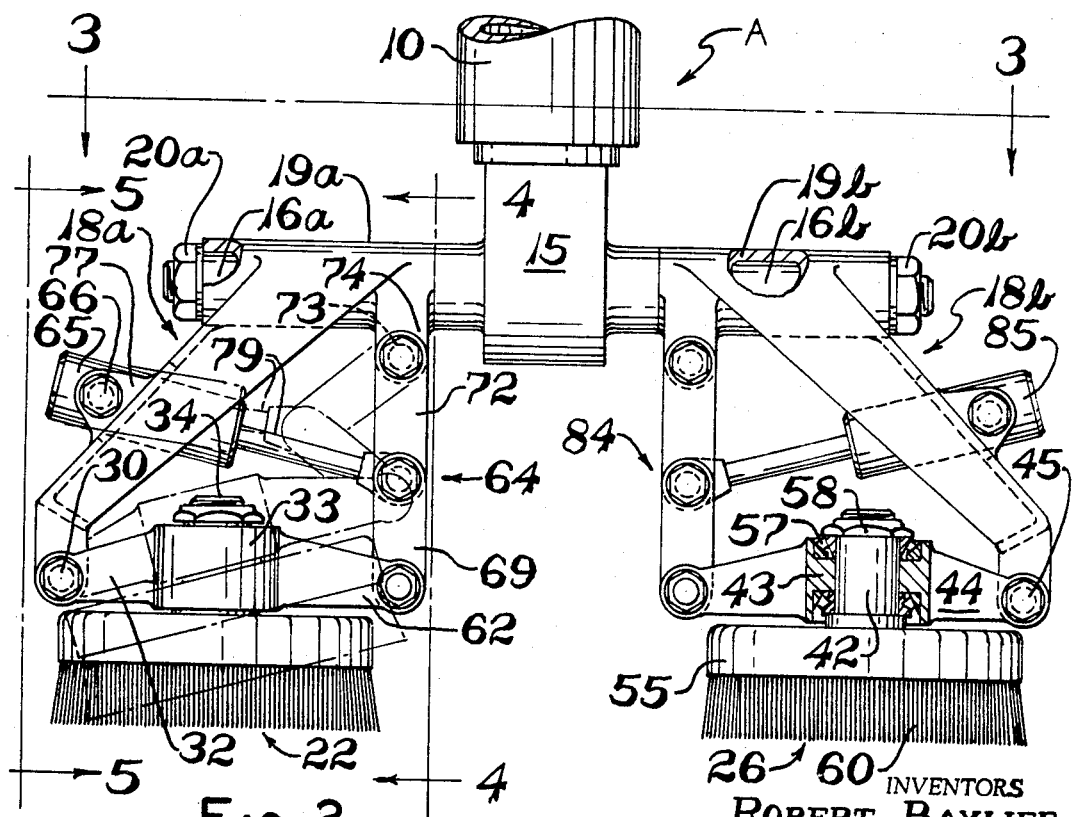
FIG. 2 is an enlarged frontal view of the left brush wheel landing gear unit A of FIG. 1, there being four brush wheels in this unit; the view also shows in phantom how the axes of the brush wheels may be varied relative to the landing surface.

In FIG. 2, housing 43 is cut away to show, in detail, how spindle 42 is mounted to support the inboard front brush wheel 26. Spindle 42 is integral with a bristle base 55 of wheel 26, and the spindle 42 fits through a set of bearings 57 in housing 43 which journals the spindle for free rotation. The spindle 42 receives a nut 58 at its upper end to fasten the spindle in the housing 43. Bristles 60 are arranged in a circular array and project from the opposite side of bristle base 55. Bristles 60 preferably cover the entire bottom side of the bristle base 55. The bristles 60 are preferably stiff resilient steel wire such as the so-called music wire, and they are attached to the bristle base 55 by the usual technique for making wire brushes of this type.

Each of the other brush wheels on the gear is of the same construction as that explained for wheel 26, and the spindle for each wheel is mounted in the same way as that shown in FIG. 2 for wheel 26.

As noted in the foregoing, the rolling resistance of these brush wheels is varied by canting the rotational spindles of the wheels laterally of their direction of forward movement. In the position of the brush wheels shown in full lines in FIG. 2 and the other figures, their spindles are substantially vertical and, accordingly, their rolling resistance is very high. In fact, where the spindles are vertical, the brush wheels do not rotate as the vehicle moves forward but act much like brush skids.

The vertical position of the wheels is useful for very high speed skid type landings. It is also useful as the "parked" position of the wheels when a vehicle is stopped. For a helicopter on a wet slippery rolling ship deck, for example, the vertical position of the brushes opposes or resists the tendency for the helicopter to slide sideways or in any other direction.

In gear unit A the two outboard brush wheels 22 and 24 are designed so that their spindles may be canted, in tandem, outwardly from strut 10. That is to say, these wheels may be swung pivotally upward toward frame 18a from the vertical position of their spindles and bristles shown in full lines in FIG. 2, about their respective pivots 30 and 39, into the chain dotted position for wheel 22 shown in FIG. 2. The effect of this movement is to reduce the number of bristle tips in ground contact, and concentrate the load supported by the wheels on a smaller number of the bristles near the periphery of the bristle base. The wheels roll progressively more freely as the inclination of the bristle base is increased.

To tilt the brush wheels 22 and 24 in tandem, the inner end 62 of forward yoke 32 and the inner end 63 of rearward yoke 38 (see FIG. 3 and FIG. 4) are pivoted to a toggle linkage 64 (see also FIG. 2) which is flexed by a hydraulic pressure cylinder 65 mounted on pivots 66 on frame plate 18a. The pressure cylinder 65 may be operated by a suitable hydraulic system (not shown) from controls located inside the vehicle.

Figure 4:
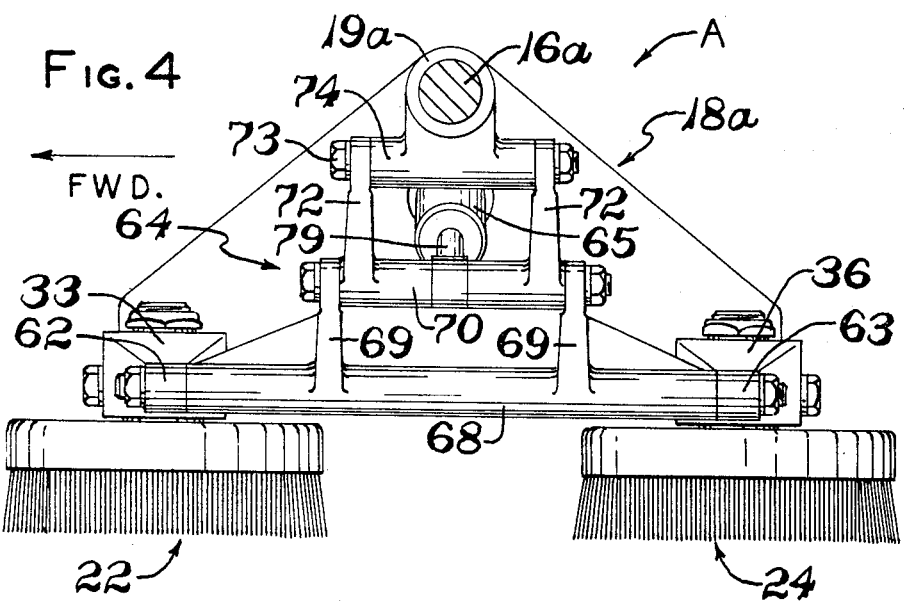
FIG. 4 is a side view of a portion of the landing gear along the line 4—4 of FIG. 2 and showing the strut side of the brush wheels.

The details of the toggle joint 64 are best shown in FIGS. 2 and 4. Referring to FIG. 4, this joint has a lower stiff rod 68 to the opposing ends of which the inner ends 62 and 63 of yokes 32 and 38, respectivley, are pivoted. About midway between the ends of rod 68 there are two parallel rigid links 69, 69 integral with rod 68. A second rod 70, forming the knee of the toggle 64, is pivotally fastened between the outer ends of links 69, 69. Rod 70 has two integral rigid parallel links 72, 72 that extend upwardly to pivotal connections 73, 73 with part 74 integral with the upper collar 19a of frame 18a.

Cylinder 65 extends through an opening in plate 18a and is pivoted at 66 between two lugs 77 on plate 18a. Its piston rod 79 is connected to the knee rod 70 (FIG. 4) so that when the cylinder is operated to retract rod 79, the knee rod 70 of the toggle 64 is pulled toward frame 18a into the chain dotted flexed position shown in FIG. 2. This action pulls rod 68 upwardly so that yokes 32, 38 are swung pivotally upward in tandem to cant the spindles of wheels 22 and 24.

On the inboard side of the strut yokes 44 and 50 of the brush wheels 26 and 28 are connected to a toggle joint 84 operated by a pressure cylinder 85 for canting brush wheels 26 and 28. Toggle joint 84 is structurally identical to toggle 64 and operated by the cylinder 85 mounted in the same manner as cylinder 65 to swing these wheels toward frame 18b. Some of the parts of toggle joint 84 are shown in FIGS. 2 and 3 near the right sides of these figures and the correspondence of these parts with those of toggle 64 will be evident.

To summarize the operation of this gear:

(a) Each brush wheel 22, 24, 26, 28 is freely rotatable on its spindle. The two outboard brush wheels 22, 24 rotate in the same direction when engaged with the ground. The two inboard brush wheels 26, 28 rotate in the same direction but opposite to the rotation of wheels 22, 24.

(b) By operating cylinder 65 to flex toggle 64, wheels 22 and 24, in tandem, are swung pivotally upward to reduce the number of bristle tips (i.e. the footprint area) in contact with the ground. This action tilts or cants the spindles of these wheels away from strut 10 and tends to minimize the rolling resistance of the wheels so that they rotate more freely in their canted position with only the peripheral part of the tips on the ground.

By operating cylinder 85 to flex toggle 84, brush wheels 26 and 28 may be swung pivotally in the same manner but in the opposite direction from wheels 22 and 24. This tilting operation is coordinated on each gear.

(c) For takeoff or landing on a vehicle such as a helicopter, brush wheels 22–26 are ordinarily in their canted position (see chain dotted position in FIG. 2).

(d) Braking of the rolling wheels is accomplished by operating cylinders 65 and 85 to pivot the brush wheels 22–26 progressively toward the full line position in FIG. 2 in which the wheel spindles are substantially vertical.

(e) For very high speed landings, preferably the brush wheels are positioned with their spindles vertical.

(f) The entire gear unit A is free for pivotal movement relative to strut 10, on spindles 16a, 16b, in the fore-and-aft direction of the vehicle.

What is claimed is:

1. Aircraft landing gear adapted for assembly with an aircraft strut and characterized by a ground-support wheel having a multitude of stiff bristles and a bristle base to which said bristles are attached so that the bristles are generally parallel to each other with the free tips of the bristles collectively defining a ground-engaging surface, and means mounting said bristle base for free rotation relative to an associated strut on an axis which is generally parallel to said bristles.

2. Aircraft landing gear according to claim 1 and further characterized by means for tilting said bristle base laterally relative to an associated strut to change the number of tips of said bristles available for ground contact and thereby vary the rolling resistance of said wheel when it is engaged with the ground.

3. Aircraft landing gear according to claim 1 and further characterized by means supporting said base-mounting means for pivotal movement on an axis transverse to said rotational axis and in a direction fore-and-aft of an associated aircraft.

4. Aircraft landing gear adapted for assembly with an aircraft strut and characterized by a ground-support wheel having a multitude of stiff bristles and a bristle base to which said bristles are attached so that the bristles are generally parallel each other with the tips of the bristles collectively defining a ground-engaging surface; means mounting said bristle base for rotation on an axis which is generally parallel to said bristles; means for tilting said bristle base laterally relative to an associated strut to change the angular position of the rotational axis of said bristle base and thereby change the number of tips of said bristles available for ground contact to vary the rolling resistance of said wheel when engaged with the ground; and means collectively supporting said mounting means and said tilting means for pivotal movement on an axis transverse to said rotational axis and in a direction fore-and-aft of an associated aircraft.

5. Aircraft landing gear assembly comprising a strut adapted to project downward and laterally from an associated aircraft, a pair of ground-support wheels each having a multitude of stiff bristles and a bristle base to which said bristles are attached so that the bristles are generally parallel each other with tips of the bristles collectively defining a ground-engaging surface; means on opposite sides of said strut for mounting said bristle bases of said wheels for rotation on an axis which is generally parallel to said bristles; and means for connecting each of the latter said mounting means to said strut.

6. Aircraft landing gear according to claim 5 wherein said wheels are aligned with each other laterally of the aircraft.

7. Aircraft landing gear according to claim 5 wherein said wheels are aligned with each other longitudinally of the aircraft.

8. Aircraft landing gear according to claim 5 and further comprising means for selectively tilting each said bristle base laterally relative to an associated strut to vary the angular position of the rotational axis of said bristle base and change the number of tips of said bristles available for ground contact to thereby vary the rolling resistance of each said wheel when engaged with the ground.

9. Aircraft landing gear according to claim 8 wherein said tilting means are arranged to tilt said bristle bases in mutually opposite directions.

10. Aircraft landing gear according to claim 8 wherein said strut-connecting means is a pivotal connection providing for pivotal movement of said wheels and said wheel-tilting means in a direction longitudinally of an aircraft on an axis transverse to said rotational axis.

11. In an aircraft landing gear assembly, a ground-support wheel composed of a multitude of stiff flexible bristles and a rigid bristle base to which said bristles are attached, said bristles being fastened in a circular array on said base and being supported so that they are generally parallel each other with the tips of all the bristles collectively defining a ground-engaging surface, and means on said base for mounting said base for free rotation on an axis generally parallel to said bristles.

12. In an aircraft landing gear assembly according to claim 11 means for tilting said bristle base for varying the angular position of its rotational axis to change the number of tips of said bristles available for ground contact and thereby vary the rolling resistance of said wheel when engaged with the ground.

13. An aircraft landing gear assembly according to claim 11, and characterized in that said mounting means and said tilting means comprise a strut and a toggle linkage on said strut to which linkage said bristle base is rotatively mounted, said linkage being adapted to effect tilting of said bristle base relative to said strut in a direction laterally of an associated aircraft.

14. An aircraft landing gear assembly according to claim 13 wherein said tilting means further comprises a fluid pressure cylinder arranged to swing said linkage pivotally relative to each other to effect tilting of said bristle base relative to said strut.

15. An aircraft landing gear assembly according to claim 11 and further comprising a pivotal connection transverse to the rotational axis of said wheel for engaging said wheel-mounting means and said wheel to said strut for pivotal movement longitudinally of the aircraft.

16. Aircraft landing gear comprising a strut; an adjustable toggle linkage connected to said strut; a pair of ground-support wheels, each including a circular array of stiff bristles and a bristle base to which said bristles are attached so that the bristles are generally parallel to each other with the tips of said bristles collectively defining a ground engaging surface, means for mounting each said bristle base to said strut for rotation on an axis parallel to the bristles with said bristle bases spaced laterally of each other relative to the lengthwise axis of the aircraft and on opposite sides of the strut, and said toggle linkage interconnecting said strut and said bristle bases and operable to provide for selective tilting of said bases to change the number of tips of said bristles available for ground contact and thereby vary the rolling resistance of the wheels.

17. An aircraft landing gear according to claim 16 and further comprising means for pivotally connecting the strut to both said adjustable toggle linkage and said rotational mounting means for arcuate movement of the latter relative to the strut in a direction lengthwise of the aircraft.

18. An aircraft landing gear comprising a strut; two adjustable toggle linkages, one connected to the fuselage side of said strut and the other to the wing side of said strut; four ground support wheels, each including a circular array of stiff bristles and a bristle base to which said bristles are attached so that the bristles are generally parallel to each other with the tips of said bristles collectively defining a ground engaging surface, the bristle bases of two of said wheels being rotatively mounted to said linkage on the fuselage side of said strut so that the rotational axes of said bristle bases are adapted to tilt towards the fuselage, and the bristle bases of the other two wheels being rotatively mounted to the opposite linkage so that their axes of rotation are adapted for tilting away from the fuselage; and means for displacing said adjustable toggle linkages individually so that the rotational axes of said pair of bristle bases can be varied to change the number of tips of said bristles available for ground contact.

19. An aircraft landing gear according to claim 18 wherein said adjustable linkages are pivotally connected to the opposite sides of said strut so that said linkages and bristle bases are free to pivot on an axis generally transversely to the rotational axes of said bristle bases.

References Cited

UNITED STATES PATENTS

| | | | |
|---|---|---|---|
| 2,007,073 | 7/1935 | Clarke | 15—49 |
| 3,276,728 | 10/1966 | Partridge | 244—108 |

MILTON BUCHLER, *Primary Examiner.*

P. E. SAUBERER, *Assistant Examiner.*